United States Patent [19]

Matsumoto et al.

[11] Patent Number: 5,135,982
[45] Date of Patent: Aug. 4, 1992

[54] WATER SOLUBLE PACKAGING FILM

[75] Inventors: Takayuki Matsumoto; Tsutomu Suzuki; Yoshiyuki Tsukamoto, all of Toyohashi; Hitoshi Nakamura, Aichi, all of Japan

[73] Assignee: Aicello Chemical Company Limited, Toyohashi, Japan

[21] Appl. No.: 722,380

[22] Filed: Jun. 26, 1991

Related U.S. Application Data

[63] Continuation of Ser. No. 164,908, Mar. 7, 1988, abandoned.

[30] Foreign Application Priority Data

Mar. 9, 1987 [JP] Japan .................................. 62-52037

[51] Int. Cl.$^5$ .............................................. C08F 8/00
[52] U.S. Cl. ...................................................... 525/61
[58] Field of Search ........................................... 525/61

[56] References Cited

FOREIGN PATENT DOCUMENTS

| | | | |
|---|---|---|---|
| 0785164 | 10/1957 | Canada | 525/61 |
| 0573248 | 3/1959 | Canada | 525/61 |
| 0602855 | 8/1960 | Canada | 525/61 |
| 0687188 | 5/1964 | Canada | 525/61 |
| 3316948 | 11/1984 | Fed. Rep. of Germany | 525/61 |
| 0671713 | 5/1952 | United Kingdom | 525/61 |
| 819945 | 9/1959 | United Kingdom . | |

*Primary Examiner*—Joseph L. Schofer
*Assistant Examiner*—J. M. Reddick
*Attorney, Agent, or Firm*—Oblon, Spivak, McClelland, Maier & Neustadt

[57] ABSTRACT

A water soluble packaging film containing a predominant amount of partially acetalized product of polyvinyl alcohol by benzaldehyde derivatives.

2 Claims, No Drawings

WATER SOLUBLE PACKAGING FILM

This application is a continuation of application Ser. No. 07/164,908, filed on Mar. 7, 1988, now abandoned.

BACKGROUND OF THE INVENTION

1. Field of the Invention

This invention relates to a water soluble packaging film containing an acetalized product of polyvinyl alcohol, and more particularly to a water soluble packaging film which is suitable for use as a packaging film of alkaline or acidic materials such as soaps, laundry detergents, bleaching agents, agrochemical and industrial chemicals.

2. Description of the Prior Art

Polyvinyl alcohol (hereinafter abbreviated as PVA) is generally soluble in cold water when the degree of hydrolysis is in the range of 80–90 mole %. However, it has been well known that PVA becomes insoluble in cold water when the degree of hydrolysis exceeds 90 mole %. Besides there is a problem in packaging of alkaline materials such as soaps or acidic chemicals such as aluminum sulfate, therein even if PVA in the film has a degree of hydrolysis of 80–90 mole %. In such cases, hydrolysis reaction of PVA proceeds during the storage with the passage of time, and cold water solubility of the film is lost when the degree of hydrolysis exceeds 90 mole %.

Therefore it has practically been impossible to use PVA based water soluble films for packaging the aforesaid chemicals. Consequently packaging films are required which exhibit stable water solubility independently of the alkaline and acidic chemicals. In addition, a film which can be removed at the development stage by dissolving in an alkaline or acidic solution is desired for the application to surface protecting films of photosensitive dry film resists developed in the alkaline or acidic solution.

SUMMARY OF THE INVENTION

The present invention has been carried out in consideration of problems on the packaging films prepared by using above mentioned PVA based water soluble films as well as on the insolubilization of PVA in cold water by exceeding the degree of hydrolysis of 90 mole %.

An object of this invention is to provide a water soluble packaging film containing an acetalized product of PVA which can maintain the cold water solubility of film even if the degree of hydrolysis increases with the elapse of time and exceeds 90 mole % during use as the above stated packaging films.

The present invention is a water soluble packaging film comprising a predominant amount of an acetalized product resulting from acetalization of PVA by using a benzaldehyde derivative of the formula (I):

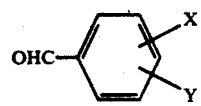
(I)

wherein X is a sulfonic acid groups or a sulfonic acid salt groups and Y represents one member selected from the class consisting of a hydrogen atom, sulfonic acid groups, sulfonic acid salt groups, halogen atom, alkyl groups and hydroxy groups.

DETAILED DESCRIPTION OF THE INVENTION

The water soluble packaging film of this invention contains, as stated above, a predominant amount of the acetalized product resulting from the acetalization of PVA by using the benzaldehyde derivative of the PVA can be used in this invention and the degree of hydrolysis of PVA is preferably 90 mole % and more.

The benzaldehyde derivative used for the acetalization of such PVA includes, for example, 2-benzaldehyde sulfonic acid and its salt (for example, sodium salt), 2,4-benzaldehyde-disulfonic acid sodium salt, 4-chlorobenzaldehyde-2-sulfonic acid sodium salt, 4-methylbenzaldehyde-2-sulfonic acid sodium salt and 4-hydroxybenzaldehyde-2-sulfonic acid sodium salt.

In order to carry out the acetalization of PVA the aforesaid benzaldehyde derivative is added to aqueous solution or dispersion of PVA in an amount of 1–30 mole %. The reaction is conducted with stirring and warming, for example, to about 70° C. in the presence of a catalyst including inorganic acids such as phosphoric acid, hydrochloric acid, sulfuric acid etc. and organic acids such as oxalic acid, acetic acid, citric acid etc. The reaction is then further permitted to proceed at room temperature. The resulting reaction mixture is neutralized and added dropwise to a large amount of acetone to reprecipitate the acetalized PVA thus formed. The acetalized product of PVA obtained is preferably controlled to have an acetalization degree of 1–30 mole %. It should be noted that the water solubility of acetalized PVA becomes no good when the degree of acetalization is less than 1 mole % or more than 30 mole %. That is, in order to provide the good water solubility for PVA having a device of hydrolysis of 90 mole % and more, the range of acetalization is not less than 1 mole % and not more than 30 mole %.

Film forming process is industrially conducted for preparing films from acetalized PVA thus obtained. In this process, the aqueous solution of acetalized PVA is cast from a nozzle onto the surface of a drum dryer or a endless belt. After drying and solidifying the solution, the resulting film is separated from the surface of dryer or endless belt.

Besides in this invention, mechanical properties and processing ability of the film prepared from the acetalized product of PVA can be improved by the addition of auxiliary agents. That is, the above mentioned acetalized product is previously mixed before casting with polyhydric alcohols such as glycerol, surface active agents, dyestuffs, pigments and anti-blocking agents such as fine powder.

The film containing a predominant amount of the acetalized PVA thus obtained exhibits good solubility in cold water even though the degree of hydrolysis of PVA itself is 90 mole % and more. Simultaneously the film has a good solubility in aqueous solutions of alkali, acid and salt. Furthermore, when the film is used for the packaging of alkaline or acidic materials, the water solubility of film is not damaged by increase in the degree of hydrolysis of PVA with the passage of time during the storage of these materials. In this connection, the dissolving mechanism of such film is not clear at the present time. It, however, is assumed that introduction of benzene rings having a high steric hindrance into PVA inhibits formation of inter- and intra-molecular hydrogen bonds of PVA even if PVA of high degree of hydrolysis is used, and hydrophilic groups substituted on benzene rings result in good solubility in cold water.

Therefore the water soluble packaging film of this invention can be used for the packaging of various alkaline and acidic chemicals such as soaps, detergents, bleaching agents, agricultural chemicals, industrial chemicals and the like. The film is very useful as the packaging film suitable for applying the intact package of these materials when these materials are used by dissolving in water.

EXAMPLES

The present invention and its beneficial effect will hereinafter be illustrated in detail with respect to the examples.

EXAMPLE 1

To a solution of 75 g of PVA having a degrees of hydrolysis of 98.5 mole % and an average degree of polymerization of 1000 (Shin-Etsu PVA C-10, a product of Shin-Etsu Chemical Co.) in 425 g of warm water was added 14.2 g of 2-benzaldehyde sulfonic acid sodium salt and 3.3 g of 85% phosphoric acid as a catalyst. The mixture was stirred at 70° C. for 5 hours and further reacted for 20 hours at the room temperature. The resulting reaction mixture was neutralized and added dropwise to a large amount of acetone to reprecipitate the acetalized product of PVA formed. The acetalization degree of the product obtained was 7.7 mole %.

The resultant acetalized product was dissolved in water, cast on a glass plate and dried at about 80° C. to prepare a film having a thickness of 30 $\mu$. The film was completely dissolved by dipping in water at 20° C. for about 30 seconds with stirring.

Besides the films thus obtained were buried in sodium carbonate powder and aluminum sulfate powder respectively, and allowed to stand at 40° C. for 2 months. Then the dissolution time in water was measured at 20° C. by the same procedure. The films were dissolved after 30 seconds respectively and found to maintain the initial solubility in water.

In this connection, the dissolution time was measured according to the following procedures.

A 1 liter beaker is charged with 800 ml of water at 20° C. and stirred with a magnetic stirrer so that the water vortex has a depth of 20–25 mm at the center. The film specimen is supported by interposing between the slide mounts of 35 mm photographic films. The mounts are suspended with a thread and dipped into the water so as to be parallel to the beaker wall. The time until the complete dissolution of film due to dispersion is measured.

EXAMPLE 2

The same procedures as described in Example were carried out in the acetalizing reaction by using PVA having a degree of hydrolysis of 99.5 (Shin-Etsu PVA SN, a product of Shin-Etsu Chemical Co.) mole % and an average degree of polymerization of 1700 together with 2,4-benzaldehydedisulfonic acid sodium salt. The acetalized PVA thus obtained had an acetalization degree of 9.6 mole %.

A mixture of 100 parts by weight of the acetalized PVA with 15 parts by weight of glycerol was dissolved in water and cast to prepare a film having a thickness of 30 $\mu$. The dissolution time of the film obtained was about 15 seconds in water at 20° C.

In addition, bags were prepared with the film. Sodium carbonate powder and aluminum sulfate powder were packed respectively in these bags and allowed to stand at 40° C. for 2 months. Then the dissolution time of the bags were measured in water at 20° C. Both bags had the same dissolution time of about 15 seconds.

EXAMPLE 3

The same procedures as described in Example were carried out by using PVA having a hydrolysis degree of hydrolysis of 98.5 mole % and an average degree of polymerization of 600 (Poval 105, a product of Kuraray Co.) together with 4-chlorobenzaldehyde-2-sulfonic acid sodium salt. The acetalized PVA obtained had an acetalization degree of 10.3 mole %.

The films prepared from the resulting acetalized PVA by the same procedures had a dissolution time of about 20 seconds at 20° C. in water.

Besides the films were buried respectively in sodium carbonate powder and aluminum sulfate powder. After standing at 40° C. for 2 months, both films had the same dissolution time in water as above.

EXAMPLE 4

To a solution of 90 g of PVA having a degree of hydrolysis of 99.0 mole % and an average polymerization degree of 1100 (Gosenol NM-11, a product of The Nippon Synthetic Chemical Co.) in 410 g of warm water was added 13.0 g of 4-hydroxybenzaldehyde-2-sulfonic acid sodium salt and 10 g of 50% aqueous citric acid solution as a catalyst. The mixture was stirred at 70° C. for 8 hours and further reacted for 20 hours at the room temperature. The resulting reaction mixture was neutralized and added dropwise to a large amount of methanol to reprecipitate the acetalized product of PVA formed. The acetalization degree of the product obtained was 5.2 mole %.

A mixture of 100 parts by weight of the acetalized product with 18 parts by weight of sorbitol was dissolved in water and cast to prepare a film having a thickness of 50 $\mu$. The dissolution time of the film obtained was about 40 seconds in water at 20° C.

In addition, a small bag having dimensions of 30×30 mm was prepared with the film. The bag was packed with 3 g of laundry detergent powder mainly consisting of straight-chain alkylbenzenesulfonic acid sodium salt, sodium carbonate and sodium sulfate. After standing for 6 months at the room temperature, the packed small bag having the content within was dissolved in 300 ml of water with stirring at 20° C. The bag was completely dissolved within a minute.

EXAMPLE 5

A solution of 60 g of PVA having a degree of hydrolysis of 97.5 mole % and an average polymerization degree of 2200 (Gosenol AH-22, a product of The Nippon Synthetic Chemical Co.) in 440 g of warm water was added with 18.0 g of 4-methylbenzaldehyde-2-sulfonic acid sodium salt and 4 g of 20% aqueous sulfuric acid solution as a catalyst. The mixture was stirred at 50° C. for 5 hours and further reacted for 10 hours at the room temperature. The resulting reaction mixture was neutralized and added to a large amount of methanol to reprecipitate the acetalized product of PVA formed. The acetalization degree of the product obtained was 12.1 mole %.

A mixture of 100 parts by weight of the acetalized product with 20 parts by weight of triethylene glycol was dissolved in water and cast to prepare a film having a thickness of 25 μ. The dissolution time of the film obtained was about 25 seconds in water at 20° C.

In addition, a small bag having dimensions of 30×30 mm was prepared with the film, and packed with 3 g of maleic acid powder. After standing for 6 months at the room temperature, the packed small bag having the content within was dissolved in 300 ml of water with stirring at 20° C. The bag was completely dissolved during 40 seconds.

In the next step, a comparative example will hereinafter be illustrated by using a PVA film without acetalization. Other comparative examples will also be illustrated by using films of acetalized products resulting from the acetalization of benzaldehyde and its derivative which are different from those used in this invention.

COMPARATIVE EXAMPLE 1

An aqueous solution of PVA having a degree of hydrolysis of 88 mole % and an average polymerization degree of 1000 was cast to prepare a film having a thickness of 30 μ. The dissolution time of the film was about 30 seconds in water at 20° C.

The films thus obtained were buried in sodium carbonate powder and aluminum sulfate powder respectively, and allowed to stand at 40° C. for 2 months. The dissolution time of resulting films was measured. These films did not dissolve in water at 20° C.

COMPARATIVE EXAMPLE 2

Benzaldehyde was reacted with PVA having a degree of hydrolysis of 98.5 mole % and an average polymerization degree of 1000 by the same procedures as described in Example 1 to obtain an acetalized product of PVA having an acetalization degree of 7.4 mole %.

The acetalized product was dissolved in hot water and cast to prepare a film having a thickness of 30 μ. The dissolution time of the film was measured in water at 20° C. The film was decomposed into small pieces, but did not dissolve completely.

COMPARATIVE EXAMPLE 3

2-Hydroxybenzaldehyde was reacted with PVA having a degree of hydrolysis of 99 mole % and an average polymerization degree of 1700 by the same procedures as described in Example 1 to obtain an acetalized product of PVA having an acetalization degree of 8.8 mole %. A film having a thickness of 30 μ was prepared from the acetalized product and the dissolution time was measured in water. The film did not dissolve in water at 20° C.

What is claimed is:

1. A water soluble packaging film consisting essentially of an acetalized product having an acetalization degree of 1-30 mol % resulting from partial acetalization of polyvinyl alcohol having a degree of hydrolysis of not less than 90 mol % by using a benzaldehyde derivative of the formula (I):

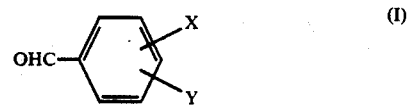

wherein X is a sulfonic acid group or a sulfonic acid salt group and Y represents one member selected from the class consisting of a hydrogen atom, a sulfonic acid group, a sulfonic acid salt group, a halogen atom, an alkyl group and a hydroxy group.

2. The water soluble packaging film as claimed in claim 1, wherein the benzaldehyde derivative is 2-benzaldehyde sulfonic acid sodium salt.

UNITED STATES PATENT AND TRADEMARK OFFICE
CERTIFICATE OF CORRECTION

PATENT NO. : 5,135,982

DATED : August 4, 1992

INVENTOR(S) : TAKAYUKI MATSUMOTO ET AL

It is certified that error appears in the above-identified patent and that said Letters Patent is hereby corrected as shown below:

On title page, item [75] Inventors: change "Yoshiyuki" to read --Yoshinori--.

In column 1, line 14, correct "agrochemical" to read --agrochemicals--.

In column 3, line 56 and column 4, line 9, "Example" should read --Example 1--.

Signed and Sealed this

Sixteenth Day of November, 1993

BRUCE LEHMAN

*Attest:*

*Attesting Officer*    *Commissioner of Patents and Trademarks*